(12) United States Patent
Rose

(10) Patent No.: US 7,626,538 B2
(45) Date of Patent: Dec. 1, 2009

(54) AUGMENTED PASSIVE TRACKING OF MOVING EMITTER

(75) Inventor: Conrad M. Rose, King George, VA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 0 days.

(21) Appl. No.: 11/923,523

(22) Filed: Oct. 24, 2007

(65) Prior Publication Data

US 2009/0109082 A1    Apr. 30, 2009

(51) Int. Cl.
G01S 13/88 (2006.01)
G01S 13/00 (2006.01)

(52) U.S. Cl. .......................... 342/195; 342/13; 342/89; 342/104; 342/107; 342/109; 342/118; 342/146; 342/147; 342/175; 342/450; 342/451

(58) Field of Classification Search ............. 342/13–20, 342/82–103, 175, 192–197, 52, 59, 156–158, 342/385, 417, 422–424, 450–465, 61–65, 342/104–115, 118, 126–147, 159–164, 350; 244/3.1

See application file for complete search history.

(56) References Cited

U.S. PATENT DOCUMENTS

| | | | |
|---|---|---|---|
| 4,516,220 A | 5/1985 | Baumann | |
| 4,746,924 A * | 5/1988 | Lightfoot | 342/453 |
| 5,285,209 A * | 2/1994 | Sharpin et al. | 342/424 |
| 5,343,212 A * | 8/1994 | Rose et al. | 342/424 |
| 5,349,207 A | 9/1994 | Malhi | |
| 5,457,466 A * | 10/1995 | Rose | 342/442 |
| 5,534,866 A * | 7/1996 | Rose | 342/13 |
| 5,585,799 A * | 12/1996 | Yankielun et al. | 342/115 |
| 5,610,609 A * | 3/1997 | Rose | 342/13 |
| 5,689,274 A * | 11/1997 | Rose | 342/417 |
| 5,870,056 A * | 2/1999 | Fowler | 342/424 |
| 5,877,998 A | 3/1999 | Aidala et al. | |
| 6,244,536 B1 * | 6/2001 | Cloutier | 342/62 |
| 6,346,184 B1 | 2/2002 | Sano et al. | |
| 6,411,249 B1 | 6/2002 | Rose | |
| 6,525,685 B1 | 2/2003 | Rose | |
| 6,535,158 B2 * | 3/2003 | Wilkerson et al. | 342/195 |
| 6,667,553 B2 | 12/2003 | Cerny et al. | |
| 6,714,155 B1 | 3/2004 | Rose | |
| 6,791,493 B1 | 9/2004 | Rose | |
| 6,801,152 B1 | 10/2004 | Rose | |

(Continued)

OTHER PUBLICATIONS

Kalman, R.E. et al.; "Controllability of Linear Dynamical Systems"; Contributions to Differential Equations vol. 1, No. 2, pp. 189-213.

*Primary Examiner*—Bernarr E Gregory

(57) ABSTRACT

In one embodiment, the disclosure relates to a method for estimating and predicting a target emitter's kinematics, the method including the steps of: (a) passively sampling, at a first sampling rate, an emitter signal to obtain at least one passively measured signal attribute for estimating the target kinematics; (b) inputting the passively measured signal attribute to an estimator at a first sampling rate; (c) determining a radar duty cycle for active radar measurements as a multiple of the first sampling rate, the multiple defining a duration between radar transmissions; (d) directing a radar system to make active target measurements at the determined duty cycle; (e) inputting to the estimator the active target measurements at the determined duty cycle, while continuously inputting the passively measured signal attributes.

51 Claims, 10 Drawing Sheets

U.S. PATENT DOCUMENTS

| | | | |
|---|---|---|---|
| 7,026,979 B2 * | 4/2006 | Khosla | 342/90 |
| 7,026,980 B1 * | 4/2006 | Mavroudakis et al. | 342/90 |
| 7,081,849 B2 * | 7/2006 | Collins et al. | 342/160 |
| 7,133,887 B2 | 11/2006 | Sirois | |
| 7,148,835 B1 | 12/2006 | Bricker et al. | |
| 7,167,127 B2 * | 1/2007 | Collins et al. | 342/160 |
| 7,256,729 B2 * | 8/2007 | Bummerstede | 342/59 |
| 7,342,536 B2 * | 3/2008 | Johnson | 342/442 |
| 7,394,046 B2 * | 7/2008 | Olsson et al. | 244/3.1 |
| 2002/0005803 A1 * | 1/2002 | Baugh et al. | 342/453 |
| 2003/0157745 A1 | 8/2003 | Zeghbroeck et al. | |
| 2003/0232465 A1 | 12/2003 | Hayakawa | |
| 2004/0207553 A1 * | 10/2004 | Rose | 342/115 |
| 2005/0001759 A1 * | 1/2005 | Khosla | 342/90 |
| 2005/0074970 A1 | 4/2005 | Serina et al. | |
| 2005/0224808 A1 | 10/2005 | Van Zeghbroeck et al. | |
| 2006/0166470 A1 | 7/2006 | Tanaka | |
| 2006/0286448 A1 | 12/2006 | Snyder et al. | |
| 2007/0015373 A1 | 1/2007 | Cowen et al. | |

\* cited by examiner

AUGMENTED PASSIVE TRACKING OF MOVING EMITTER

BACKGROUND

1. Field of Invention

This disclosure relates to the radar and Electronic Warfare Support Measures (ESM) systems located on a single aircraft. In one embodiment, the disclosure utilizes infrequently scheduled radar inputs to an otherwise passive ESM target tracking filter to enhance the performance of the passive tracker while minimizing the chance the radar is detected by ESM or Radar Warning Receivers (RWR) on other platforms.

2. Description of Related Art

FIG. 1 shows a typical conventional installation of the ESM and radar systems on tactical aircraft. In such installations the active detection system (represented by radar 105) and the passive detection system (represented by antenna pairs 108, 109) are essentially separate, as shown. Both systems have tracking filters 100 and 101. The inputs to the radar tracking filter 100 are target azimuth a, range r, and if the radar measures Doppler, radial rate $\dot{r}$. Hence, the input to the active detection radar system is either the vector 102 or 103. The input to passive detection system filter 101 is the scalar azimuth or bearing a 104. Hence, this filter is called a bearings-only estimator.

These filters are typically used to track targets at different ranges. The reflected signal power the radar works with is proportional to $1/r^4$ while the direct path power the ESM receiver detects is proportional to $1/r^2$. So often in conventional systems the trackers are employed in a complementary manner, with the ESM tracker used mostly for distant emitters and the radar tracker for close-in targets. But there are also tactically important situations where the ESM tracker is used close-in to avoid threat intercept receivers, i.e., 111 located on other aircraft, detecting the radar, and hence the presence of ownship. Thus, an embodiment of the disclosure is concerned with this overlap region, where the radar can detect the emitter, but it is advantageous to use passive, bearings-only tracking.

In addition to detection avoidance, there are other benefits to bearings-only tracking. The ESM tracker has a field of view (FOV) advantage over the radar. To detect targets and subsequently measure azimuth and obtain range information the radar electronically or mechanically steers its antenna 105. This maximizes pattern gain in different angular directions to compensate for the $1/r^4$ loss, but can only be done within a restricted FOV 106. By contrast, the ESM system measures signal angle of arrival (AOA) using passive interferometers, for example $107_1$. Although an interferometer has at most a ±90° FOV, nearly 360° coverage is achieved by switching 121 between several antenna pairs such as 108, 109 to create additional long baseline interferometers or LBI, e.g., $107_2$, around the aircraft.

But while the bearings-only ESM target estimator 101 can track emitters at any relative bearing and at ranges several times further out than detectable by the radar, there its advantage over the radar tracker 100 ends. It ends because recursively estimating target position and velocity from the single azimuth input 104 is much less straightforward than estimating kinematics from the vector inputs 102 and 103.

A problem in bearings-only estimation is a sequence of bearing measurements cannot be uniquely associated with the correct emitter position and velocity without the observer undergoing special accelerations. That is, as described by Fogel and Gavish in "$N^{th}$-Order Dynamics Target Observability from Angle Measurements", *IEEE Transactions on Aerospace and Electronic Systems*, AES-24, 3 (May 1988), conventional bearings-only passive emitter tracking requires the observer to maneuver during the sequence of receiver dwells to collect the angle measurements. The special maneuver required depends on the target motion, and in particular not just its velocity, but various higher order derivatives of its velocity. Of course, since the target's motion is not known beforehand, neither is the observability maneuver required.

Because the observability maneuver is not known, it is common for the ESM tracker design to incorporate the unwarranted a priori assumption the target is flying a constant velocity track requiring, according to Fogel and Gavish, the observer to fly two constant velocity legs on different headings. Thus prior methods of bearings-only target tracking, e.g., as described by U.S. Pat. No. 5,877,998 Aidala, et al. in "Recursive Method for Target Motion Analysis," emphasize such observer motion. But then even if the emitter happens to indeed be flying a constant velocity track, convergence to a range estimate occurs only after the observer completes the first leg and turns. That is, the target is located only after the second leg has begun. Hence, Aidala notes it is an object of its invention "to provide an improved method . . . for providing range estimates as soon as two measurement legs of data become available."

The emitting aircraft may be flying any of a host of missions. These missions each involve special flight regimes such as cruise, loiter, supersonic dash and missile launch. Some regimes incorporate long constant velocity legs but all also require heading changes and other accelerations. So the chance that a significant number of detected emitters will be at constant velocity throughout the initialization phase is small. This leads to the frequent failure of bearings-only estimators to initialize correctly and prevents their subsequent convergence to the true target track. Further, even when they do converge the target is likely to subsequently undergo an acceleration that causes a constant-velocity estimator to break track or diverge.

Techniques exist addressing the track divergence problem. One example is Applicant's patent application Ser. No. 11/637,702, filed Dec. 13, 2006, now abandoned, and entitled "Method and Apparatus for Tracking a Maneuvering Emitter Utilizing Reduced Order State Estimators". According to an embodiment, the disclosure allows a bearings-only estimator with a constant velocity core model to track targets through various maneuvers.

FIG. 3 illustrates the performance of the so-called "Reduced Order" adaptive method using flight test data obtained in experiments carried out by the Electronic Systems Division of Northrop Grumman Corporation. FIG. 2 shows the tracks flown to generate bearing measurement data. To describe the reduced order adaptive method, reference is made simultaneously to FIGS. 2 and 3. Referring to FIG. 2, aircraft 200 is the observer and aircraft 201 is the emitting or target aircraft. Before observer aircraft 200 (ownship) turns at 202, the ESM estimator "floats" 301 (see FIG. 3) at a fictitious range of about 100 nmi. After the turn, the estimator enters a transient phase 302 where it begins convergence. The convergence phase last for over 20 seconds until at 303 target aircraft 201 maneuvers 203. A conventional tracking filter would diverge at this time, but the adaptive feature of the estimator allows re-convergence 304. The filter then follows 305 the target track through subsequent target maneuvers 204 and 205.

FIG. 4 shows the range accuracy achieved of FIGS. 2 and 3. Because of the target maneuver during the transient state, convergence took 50 seconds after the observer's first turn, i.e., it ended about 70 seconds after the track was initiated at point 400. Thereafter, the range accuracy averages 5% despite maneuvers (401) that would have caused conventional estimators to break or lose track.

It is possible to shorten the initial convergence time and mitigate the onerous observer maneuver requirement using the Applicant's disclosure entitled: "Method of Passively Estimating an Emitter's Position and Velocity Using Bearings-Only without Requiring Observer Acceleration", issued as U.S. Pat. No. 6,714,155 ("the '155 patent). According to one embodiment of the '155 patent, a set of possible ranges and corresponding velocities is generated for an emitter without an observer heading change. This is done, in part, by identifying the emitting aircraft's flight regime from radar parameters measured by the ESM system. This information, coupled with bearing rate measurements, provides a set of possible ranges and velocities. Hence the method ameliorates the observability problem but does not typically solve it with a unique initial target state. After convergence the track accuracy would still average 5%.

Although excellent for a bearings-only estimator tracking maneuvering targets, 5% accuracy is poor compared to that achieved by the active radar tracker 100 (FIG. 1). The radar can track a target with an error measured in meters rather than kilometers. Further, the target's motion is immediately observable from the measurement set 102 or 103. No ownship maneuver is required for the tracker to converge, although the aircraft may still have to maneuver to keep the target within the restricted FOV 106.

Since radar receiver 119 may receive multiple returns in a single burst from transmitter 120, complex processing is required to establish a radar track. In a typical sequence, Mode Controller 115 establishes a search mode, then an acquisition mode and finally a track mode.

The radar detects new targets in search mode by scanning spatial volumes. The scanning is done by electronically or mechanically steering the gain of the highly directional antenna or array 105, periodically revisiting a set of relative azimuths and elevations. Returns are filtered scan-to-scan to remove stationary or slow moving reflections by utilizing either incoherent or coherent moving target indicator ("MTI") processing. This processing occurs at signal processor 118 of FIG. 1.

Most remaining returns belong to moving targets. These returns undergo associative processing to initiate target tracks in an acquisition mode. Logic checks reasonable kinematic limits on subsequent scans, eventually either confirming a tentative track as valid or rejecting it. The successfully-promoted target then enters a dedicated track mode, with its position, velocity and possibly higher order kinematics updated by radar target tracker (interchangeably, target filter) 100.

In the initial search or scan mode the time between target tracker updates depends on the antenna gain steering. For example, if the scan revisits the target's spatial volume 4 times a second, the tracker update will average 4 Hz. In the dedicated track mode a phased array radar can time share a single beam among several targets, allowing very rapid tracker updates. Thus, the estimator updated at 4 Hz in scan may be updated at 16 Hz or faster when in track mode.

Unfortunately for the radar, this well-established scan, acquisition and track mode behavior is exploited by ESM systems on other platforms to detect it and passively range its location. Hence, radar pays a price for its excellent trajectory estimation capability. The threat's ESM system implements a tuning strategy based on knowledge of radar modes to assure the receiver 111 scanning in frequency is able to intercept a spatially scanning transmitter within an acceptable time. That is, the ESM system design addresses and solves the scan-on-scan mean time to intercept ("MTTI") problem. In solving this problem there is a trade off between false alarms, i.e., detections triggered by noise and MTTI. To assure a radar was detected, typically several sequential detections on subsequent closely spaced dwells are required. It is critical to avoid spurious detections or false alarms. These seriously impact the ESM system's ability to detect new emitters.

Understanding the extremely deleterious effect of false alarms requires understanding ESM parameter extraction. For example, once a radar is detected pulse parameter measurements type or "fingerprint" it in process 112. These parameters are then stored in Active Emitter File (AEF) 114 and subsequently used to sort new detects from old in process 113. An example parameter used in such sorting is the pulse repetition interval or PRI. Obtaining parameters like PRI requires collecting many pulses with an extended dwell. That is, receiver 111 must tune to one fixed frequency for a comparatively long time. However, sitting on one frequency impacts detecting new emitters and hence MTTI. Extended dwells are only scheduled after the emitter has been detected in more than one dwell to ensure the probability of false alarm is near zero.

Emitter parameter measurements provide vital information about the radar's mode. This in turn provides extremely valuable insight into the threat's intent and hence flight regime. For example, the '155 patent utilizes this information in determining possible initial emitter range, speed and headings. Another critical use is determining if ownship is in danger. For example, U.S. Pat. No. 7,148,835 to Bricker, et al. and entitled: "Method and Apparatus for Identifying Ownship Threats" determines whether the observer is engaged by a radar in track mode, possibly as a preliminary to the threat launching a missile.

In summary, ESM systems are excellent for fingerprinting radar systems and assessing their intent. But ESM passive emitter tracker performance is fragile and uncertain because it is impacted by initialization, convergence and track maintenance problems. Even when passive trackers converge to the correct track, the resulting errors are large compared to active radar estimators.

Radar systems do a superb job accurately tracking targets. They achieve their accuracy by measurements involving range information as well as azimuth and by further implementing special operational modes. These modes ultimately generate the very rapid measurement updates needed to closely follow targets through maneuvers.

But as a consequence, the radar also provides copious quantities of data to threat ESM systems. ESM systems extract parameters from this data. These parameters establish the state of the radar and particularly its mode of operation (e.g., search, acquisition or track). This information is then used to neutralize the radar with defensive flight maneuvers and Electronic Counter Measures (ECM).

SUMMARY

The embodiments of the disclosure, overcomes the ESM tracker deficiencies and radar vulnerabilities by, among others, improving critical operational and performance aspects of the radar and ESM systems on ownship.

In one embodiment, the tracking deficiencies are overcome by providing a new mode of radar and ESM tracker operation such that the ESM tracker is substituted for the radar tracker and the ESM system initiates radar operation. A feature of this embodiment is that the ESM azimuth measurement sequence is interleaved with radar generated range information where the radar information is transformed to an augmented measurement infrequently input to the ESM tracking filter. In between augmented updates, the ESM tracker continues to operate as essentially a bearings-only estimator. The threat electronic support measures system typically ages out the infrequent radar updates as false alarms. Thus the invention effectively creates a new low probability of intercept (LPI) radar track mode.

In another embodiment, the disclosure relates to providing a flexible and robust means for new and existing radar and ESM system operation by combining the ESM azimuth measurement sequence with infrequently scheduled updates of radar range information to thereby form an augmented measurement sequence input to the ESM tracking filter.

In another embodiment, the disclosure relates to a method for estimating and predicting a target emitter's kinematics, the method comprising the steps of: (a) passively sampling, at a first sampling rate, an emitter signal to obtain at least one passively measured signal attribute for estimating the target kinematics; (b) inputting the passively measured signal attribute to an estimator at a first sampling rate; (c) determining a radar duty cycle for active radar measurements as a multiple of the first sampling rate, the multiple defining a duration between radar transmissions; (d) directing a radar system to make active target measurements at the determined duty cycle; and (e) inputting to the estimator the active target measurements at the determined duty cycle, while continuously inputting the passively measured signal attributes to the estimator.

In still another embodiment, the disclosure relates to a an apparatus for estimating an emitter's kinematical state, the apparatus comprising: a primary control circuit having at least one microprocessor configured with instructions to control a passive measurement system and an active measurement system and to: (a) passively sample, at a first sampling rate, an emitter signal to obtain at least one passively measured signal attribute for estimating the target kinematics; (b) input the passively measured signal attribute to an estimator at a first sampling rate; (c) determine a radar duty cycle for the active measurements system, the duty cycle defining a duration between emitter detection by the active measurement system; (d) direct the active measurement system to detect emitter consistent with the duty cycle; and (e) input the active target measurements to the initially-passive estimator consistent with the duty cycle while continuously inputting the passively measured signal attributes to the estimator.

In yet another embodiment, the disclosure relates to a device for determining emitter kinematics, comprising: a passive measurement system for passively sampling an emitter signal and determining a sequence of emitter bearings from a sampled signal; a filter circuit for determining at least one of an emitter state, the emitter state including an emitter velocity and an emitter position; an active measurement system for actively measuring at least one of an emitter range or a radial range rate; and an augmented measurement controller in communication with the passive measurement system and the active measurement system, the augmented measurement controller receiving data from the passive measurement system and deriving a control signal for the active measurement system, the control signal defining a set of radar transmission times as a function of the passive measurement system.

BRIEF DESCRIPTION OF THE DRAWINGS

These and other embodiments of the disclosure will be described with reference to the following exemplary and non-limiting drawings in which the same elements are numbered identically and where.

DETAILED DESCRIPTION

Figure 5A:
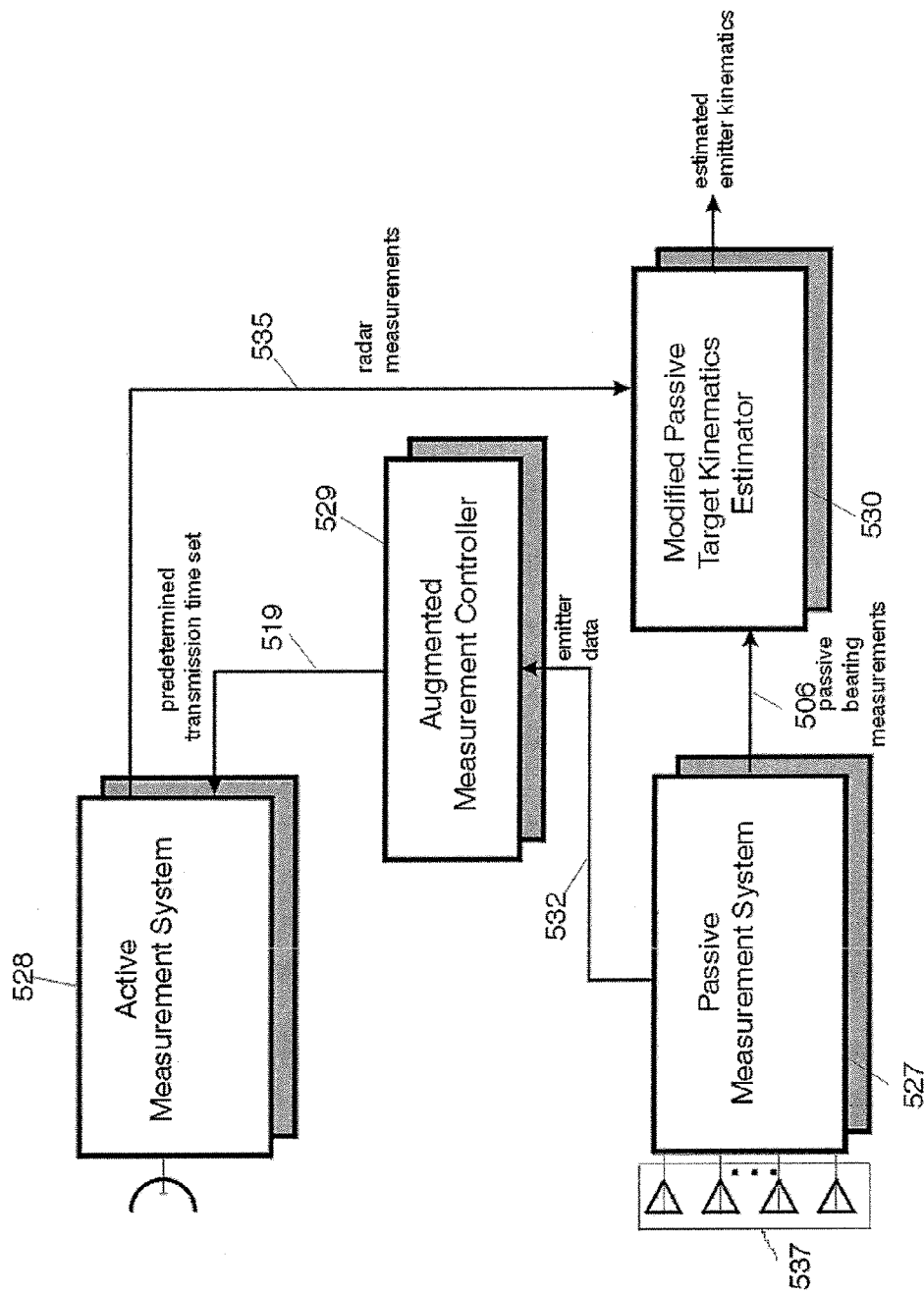
FIG. 5A is a system representation according to one embodiment of the disclosure.

FIG. 5A is a system representation according to one embodiment of the disclosure. Referring to FIG. 5A, passive antennas 537 can be placed at different positions to capture and communicate passive signal emission from a target emitter (not shown) to passive measurement system 527. The data from massive measurement system 527 can be directed to augmented measurement controller 529 and modified passive target kinematics estimator 530. Specifically, passive measurement system 527 can communicate passive bearing measurements 506 to modified passive target kinematics estimator 530 to estimate emitter kinematics. Passive measurement system 527 also provides emitter data 532 to augmented measurement controller 529 which then determines radar transmission times (interchangeably, duty cycle) 519 and communicates the same to active measurement system 528. Active measurement system 528 then directs radar system to conduct active measurement and reports the radar measurements 535 to modified passive target kinematics estimator 530. The kinematics estimator 530 estimates the emitter's kinematics based on passive bearing measurements 506 and radar measurement 535.

Figure 5B:
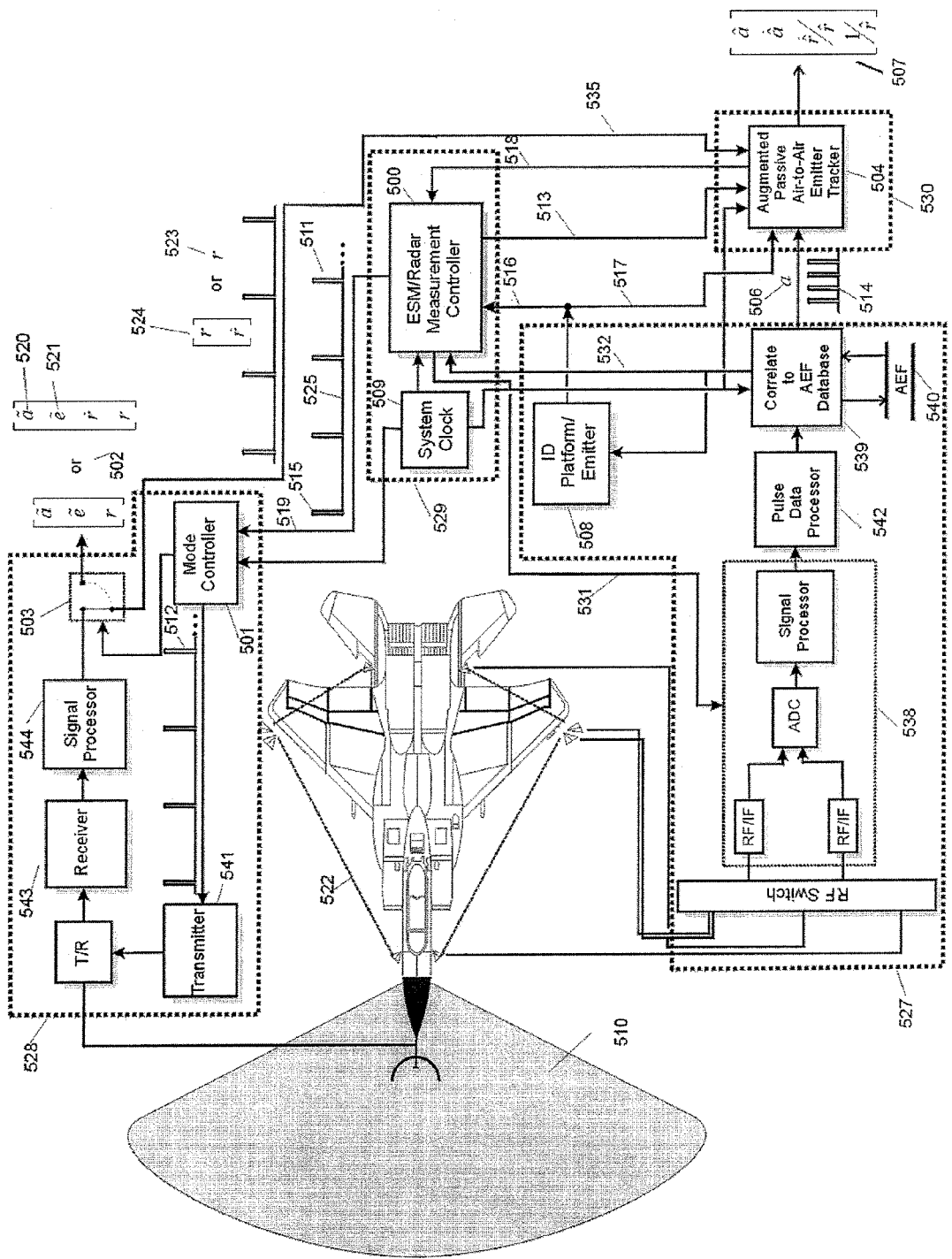
FIG. 5B is a top-level representation according to another embodiment of the disclosure.

A more comprehensive description of an embodiment of the disclosure is provided at FIG. 5B. In FIG. 5B, ESM/Radar Measurement Controller 500 generates the radar update schedule 511 implemented by the modified Mode Controller 501 as transmit commands 512. It also alerts 513 the Passive Air-to-Air Emitter Tracker 504 to now accept an augmented measurement sequence. In this augmented sequence the ESM azimuth 506 inputs to this tracker have a much higher average update rate duty cycle 514 than the radar range inputs 506 or 505. The radar inputs update at the mode command rate 512. Azimuth typically updates at 1 Hz. The azimuth to range update ratio may be 15:1 or higher. Hence the radar burst determined by 512 may be 15 seconds or more apart.

In generating the scheduled request, represented by duty cycle 511, the ESM/Radar Measurement Controller must solve two problems: track initialization and track maintenance. Current radars solve these two problems by implementing the conventional search, acquisition and track modes. But in this new LPI approach initialization is particularly tricky for the Measurement Controller, because generating the first request 515 supplants both traditional search and acquisition modes. Hence it must assure radar range measurement with a single burst, but not require the usual search or acquisition transmissions and processing. The second problem, maintaining track, involves determining the radar duty cycle schedule maximizing track accuracy while also minimizing the chance of threat ESM exploitation.

Process ID Emitter/Platform 508 is involved in solving both initialization and maintenance problems. For initialization it cues Controller 500 after identifying the emitter mode and possibly further determining the emitter platform. Based on these characterizations, it can evaluate the emitter for augmented tracking and sends 516 the viable candidates on to Measurement Controller. ID Emitter 508 also sends target information 517 to augmented passive tracker 504. Augmented passive tracker 504 can use this information to set measurement and process noise covariance and other parameters to tailor estimation performance to the specific emitter. Augmented passive tracker 507 does this even if it subsequently remains in a bearings-only mode.

Augmented passive tracker 504 also informs 518 Radar Measurement Controller 500 on the state of the emitter's track. There are two general possibilities: the emitter is either an initial detection with unknown range or bearings measurements 506 have been made for some time and Augmented Passive Tracker 504 has converged.

If convergence has occurred, Radar Measurement Controller 500 uses the passive tracker estimates 518 to determine whether the emitter is within radar detection range and field-of-view. If so, it predicts target location at the time of the initial transmission request 515 and sends the request time and predicted range and azimuth 519 to Mode Controller 501 to pass on to transmitter 526.

But if convergence has not occurred Mode Controller 501 still may require emitter range and predicted azimuth in this initialization phase to preclude the radar's need for search and acquisition modes. ID Platform/Emitter 508 then provides such information by implementing a method of Applicant's '155 patent, hence determining the set of possible emitter ranges and velocities without Passive Tracker 504 initially converging. Now ESM/Radar Measurement Controller 500 must work with a set of candidate threat ranges and angle rates rather than an unique range and azimuth. As such, ESM/Radar Measurement Controller 500 instructs Mode Controller 501 to treat each range and angle predicted via the associated angle rate as correct, starting with the closest and doing successive transmissions until target detection. Thus, for both initial and ongoing passive tracks the invention can eliminate radar search and acquisition modes, exploiting the ESM system's advantage in detecting emitters at very long range and all relative bearings.

Receiving the first augmentation request 515, Mode Controller 501 sets to a special state. In this state measurements 502 no longer input to the radar tracker. Instead a switch 503 (e.g., virtual switch) diverts the radar data to the ESM filter. Although the active measurement system (or, radar tracker) 528 can be run in parallel with the passive measurement system (ESM tracker) 527, there can be little point in doing so. Running the radar tracker implies rapid updates and hence frequent transmissions. But an advantage of certain embodiments disclosed herein is that they require very infrequent radar updates.

In this new configuration the radar azimuth measurement $\tilde{a}$ 520 can be discarded. The elevation measurement $\tilde{e}$ 521 may be used to cone correct the angle-of-arrival measurements made on interferometer baselines such as 522. Cone correction can be part of the processing ESM systems implement to generate true azimuth 506, but $\tilde{e}$ can only be helpful if the ESM system does not measure elevation as accurately as the radar. Even then it may not be used because the ESM system usually adequately cone corrects by assuming the emitters are all at the observer's altitude. So this measurement may also be discarded. The radar diverted measurements can consist of range 523, or, if Doppler is available, range and radial range rate 524. These are interleaved with the ESM azimuth sequence input to Augmented Passive Air-to-Air Emitter Tracker 504 to form the augmented measurement sequence.

In its most general form, the augmented measurement vector can consist of functions of the azimuth 506 and the range data 523 or 524 consistent with the estimator 504 state model. But compatibility with the core tracker model may not require azimuth incorporated into the augmented measurement. If only range is available, the augmented measurement can be a scalar function of range alone. For clarity augmented measurements incorporating azimuth are called merged augmented measurements. Generating these merged augmented measurements requires special ESM processing which is further discussed below. Thus, the ESM tracker implementation may incorporate any target state model or set of models with the augmented measurement, whether merged or not, configured appropriately to that state model.

As an example, the estimator state 507 is shown for the core bearings-only estimator. This state is described in an article by Aidala and Hammel, entitled "*Utilization of Modified Polar Coordinates for Bearings-Only Tracking*," IEEE Transactions on Automatic Control, vol. AC-28, March 1983. The particular merged augmented measurement vectors appropriate for this model are provided below particularly with reference to Equation 3 and Equation 4.

But an advantage of using modified polar coordinates is separation of azimuth and range in the elements of state vector 507. That is, the quantities measured separately by the radar and ESM system are also disjoint in the core estimator state. Thus, merged augmented measurements are not necessary for this model. The non-merged augmented measurements transformed from radar data consistent with the state are, for 523:

$$\frac{1}{r} \qquad (1)$$

and for 524

$$\begin{bmatrix} \dot{r}/r \\ 1/r \end{bmatrix} \qquad (2)$$

The system clock 509 provides the radar measurement time, as well as passive bearing measurement time, and hence provides the basis for generating the time references sent 513 by the ESM/Radar Measurement Controller 500 to the augmented passive estimator 504, enabling the formation of the augmented measurement sequence.

Interleaving augmented measurements (1) or (2) into the bearing sequence avoids timing issues involved in forming the merged augmented measurement vector. The timing issues arise because the radar and ESM systems make their respective range and angle measurements independently. Thus, in forming the merged augmented measurement some extrapolation is needed. Hence the time assigned the merged measurement vector is typically not the system clock 509 time associated with each original measurement of the individual merged vector elements, but the system clock still provides the means for extrapolating to a common time reference.

It is readily verifiable that the estimator state, in this example 507, is immediately observable from augmented input incorporating either 505 or 506 after a short bearing sequence initialization. This can be shown in a number of ways, but in particular by using the original results presented in article by Kalman, Ho and Narenda, entitled: "Controllability of Linear Dynamical Systems," *Contributions to Differential Equations*, Vol I, McMillan, N.Y., 1961. Thus, with the first augmented measurement input generated by initial Controller request 515 the filter converges with no observer acceleration required or transient delay.

Thus, with the first augmented measurement input ESM/Radar Measurement Controller 500 establishes a target track and is ready to undertake the track maintenance task. Track maintenance requires determining the time 525 between subsequent radar update requests. Also, after the general rate is established specific update times must still be individually adjusted to account for the target moving out of the FOV 510 or beyond detection range. Thus, if the schedule results in a periodic rate, the rate can be used as a guideline and not a rigid requirement.

In the simplest implementation, after ESM tracker converges 504 (in this case there is one augmented measurement that initializes the tracker) ESM/Radar Measurement Controller 500 requests no further augmented measurements. That is, the measurement period generated is infinite. This provides ESM tracker 504 initialization with minimum impact to normal radar operation. However, a desirable implementation would be to further augment the ESM azimuth measurement with range information at a finite rate. Doing this greatly improves the accuracy of the bearings-only track estimates between augmented updates. It can further prevent or limit divergence in conventional non-adaptive estimators due to target maneuver. Finally, it can allow adaptive ESM estimators to achieve track accuracy sufficient to substitute for radar trackers in some tactical environments.

As noted, bearings-only adaptive estimators such as in the inventor's application Ser. No. 11/637,702 ("the '702 application"), filed Dec. 13, 2006, now abandoned, entitled: "Method and Apparatus for Tracking a Maneuvering Emitter Utilizing Reduced Order State Estimators" are specifically designed to not break track during target maneuvers. Hence, augmented inputs are not required to prevent track divergence. But the estimate accuracy may still degrade because maneuvering targets exhibit general $n^{th}$ order dynamics in the sense of Fogel and Gavish, with adaptive estimators designed to optimally track motion up to a certain fixed value of n. Hence radical maneuvers of a higher order cause degradation. Utilizing augmented measurements greatly improves accuracy over bearings-only in radical maneuver regimes, as well as improving accuracy during model-compatible target motion.

There are generally two choices in implementing the sequential update requests 511. The duty cycle can either be found for the ensemble of all threats, or tailored to individual emitters and platforms. Either way, the time delta 525 between requests is long enough so if detected the radar intercept either ages out or is classified a false alarm. Using this approach, the an embodiment of the disclosure provides both bearings-only track accuracy improvement and prevents threat ESM systems from exploiting ownship's radar transmission by subsequent processing of the burst.

Figure 9:
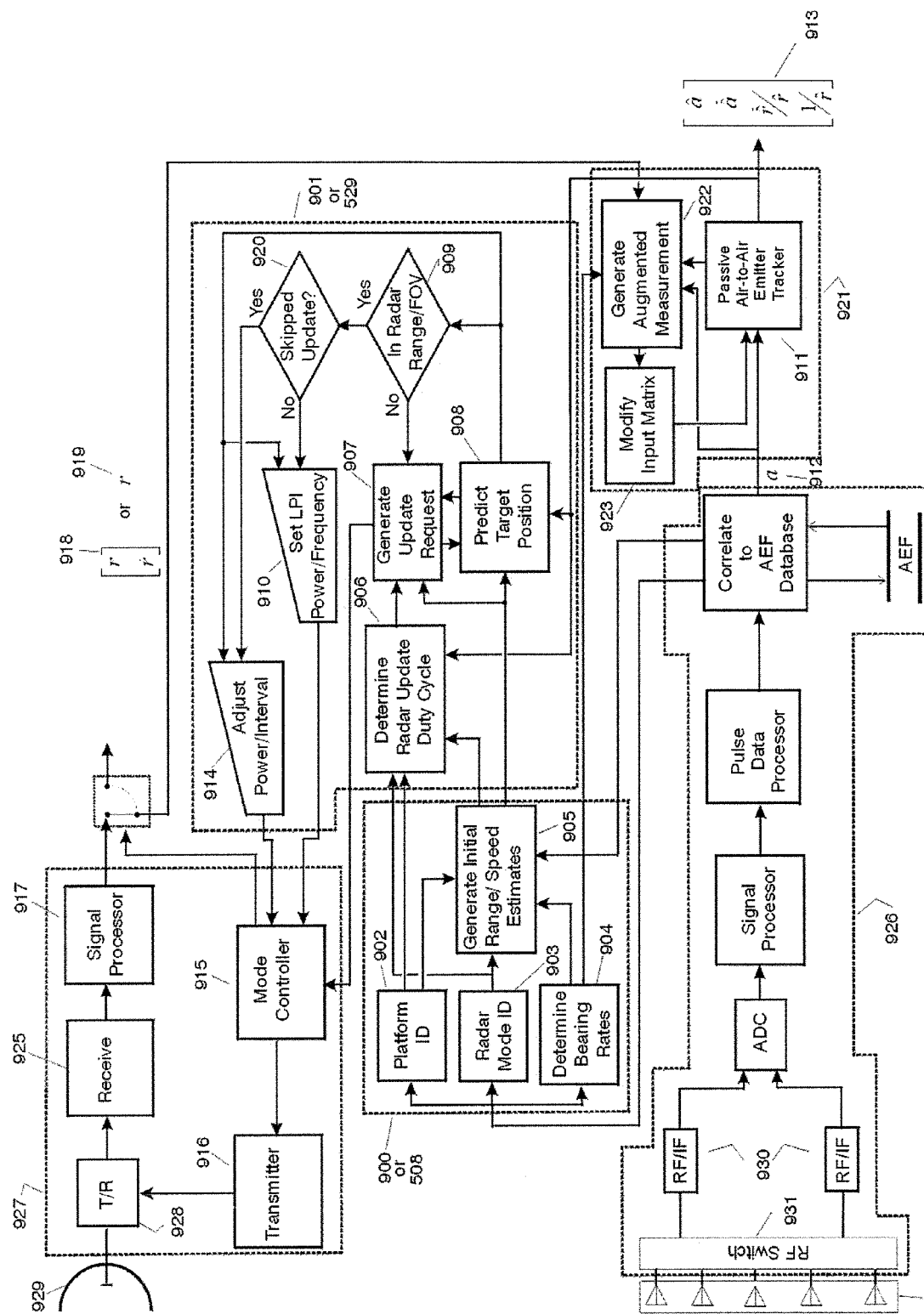
FIG. 9 is a schematic system representation of another embodiment of the disclosure.

Reference is now made to FIGS. 5A, 5B and 9 of the disclosure to disclose another embodiment of the disclosure directed to a device for determining emitter kinematics, and in particular for tracking a moving target. The tracking device may include a Passive Measurement System 527 for passively sampling an emitter signal and determining an emitter bearing from each sample; a Filter Circuit 530 including a kinematics estimator. The kinematics estimator may be modified from a strictly passive filter so that the estimated emitter kinematics, including at least velocity and position, are derived from either emitter bearings measured by the passive system alone, or passive emitter bearing measurements augmented by active target measurements. The tracking device may also include an Active Measurement System 528 for periodically transmitting and making measurements as a result of the transmission, the measurements including target range, and possibly, radial range rate, in communication 535 with the modified passive filter (or Augmented Passive Emitter Tracker 504). The tracking device may additionally include an augmented measurement controller 529 in communication with both the Passive Measurement System 527 and Active Measurement System 528, receiving data 532 from the passive system, deriving from that data a controlling signal communicated 519 to the active system, causing the active system to transmit a control signal. The control signal may include a set of future transmission times 511 predetermined by the Measurement Controller 500, where the control set is a function of the passive signal measurements made by system 527.

The augmented measurement controller 529 determines from the passive measurement system data a Controlling Signal 531 establishing the desired emitter bearing input rate to the filter 530, and causing the emitter signal to be sampled at least at this rate by passive measurement circuit 538.

The augmented measurement controller 529 can also instruct 513 the Filter to modify its configuration to accept measurements augmented with the active measurement data 535.

In one embodiment, the augmented measurement controller 529 can determine the input rate of the augmented data from a combination of estimator track accuracy performance 518, achieved bearing data rate 514, and emitter data 532. The augmented measurement controller 529 can instruct the active measurement system 528 to update with a controlling signal 511 that achieves the determined augmented input rate.

The modified Passive Tracker circuit 530 may incorporate a passive emitter tracking sub-circuit 911 (FIG. 9), a sub-circuit for generating Augmented Measurements 922, and an input Modifying sub-circuit 923 enabling the tracking circuit to estimate emitter kinematics from the target bearing measurements alone, or from range data communicated from the active measurement system in an augmented measurement, with no modification to the Passive Emitter Tracker sub-circuit 911 from the passive bearings-only configuration.

The Measurement Controller 529 may further incorporate a System Clock 509 for synchronizing the Modified Passive Estimator circuit 530 inputs with the active (Radar) measurement system outputs 535. The active system outputs synchronized by the clock can be range and range rate 524, or range alone 523; and the passive system outputs synchronized can be bearing measurements 506.

The Active Measurement system 528 can be a radar system incorporating a transmitter 541 controlled by a mode controller 501 and having a receiver 929 (FIG. 9) and signal processor 917 to extract range and possibly radial range rate from the reflected signal.

The passive measurement system can incorporate Passive Signal Sensors 537, with the emitter signal impinging on these sensors detected and measured by an Intercept Receiver 538, with the measured data further processed by an emitter correlation circuit 539 to enable association of the emitter to an onboard Database 540, with this correlated data undergoing further correlation processing in Emitter-to-Platform Identification Circuit (interchangeably, correlation circuit) 508. Data from the Passive Measurement circuit 527 can be used in the Modified Passive Target Tracking circuit 530 to alter measurement and target statistics incorporated in the estimator 504 processing.

The Correlation Circuit 508 can also incorporate a platform ID sub-circuit 902 (FIG. 9), Radar Mode ID sub-circuit 903 (FIG. 9), and Baring Rate Determining sub-circuit 904 (FIG. 9), with the bearing rate enabling the estimation of initial speed and heading, and hence possible emitter ranges, by sub-circuit 905 (FIG. 9). Further, the Platform and Radar ID Circuit outputs, combined with the heading/speed and corresponding range estimates, can be used by Measurement Controller 529, utilizing logic in the radar update duty cycle determination circuit 906 (FIG. 9), to set the desired radar transmission temporal spacings 525.

The temporal spacings 525 can be determined by logic in processor 906 (FIG. 9) and can be further modified by logic in the Generate Update Request Processor 907. The modification can be a function of the circuit 908 Predicted Target Position at the next transmission time and logic circuit 909 for determining if the target is in the radar field of view 510 at that time.

In another embodiment, the tracking device may include Measurement Controller 529 in communication with Mode Controller 501 in the active radar measurement system 528. Input from the measurement controller causes the mode controller to instruct Transmitter 541 updates at a duty cycle 512. The duty cycle can be a function of the transmission temporal spacings 525 which can be determined by Measurement Controller 500. Control logic 910 (FIG. 9) may cause the mode controller to adjust the radar low-probability of intercept mode 910 (FIG. 9) to reduce the likelihood of transmission detection by the threat intercept receiver while maximizing the likelihood of reflected signal detection by radar system receiver 925. The adjustment can be affected by the determination of logic circuit 920 as to whether the previous radar transmission request from processor 907 was satisfied or not. Control logic 914 (FIG. 9) can cause Mode Controller 914 to adjust transmitted power and pulse repetition interval according to the predicted emitter range from Prediction circuit 908, to maximize the probability of target detection and also to enhance the accuracy of the radar measurements.

The Augmented Passive Emitter Tracker 504 may incorporate passive air-to-air tracking filter (see FIG. 9) whose measurement input is modified to accept augmented measurements.

It should be noted that these and other embodiments may be implemented with an existing ESM-radar installation or can be incorporated ab initio into a new design.

Example 1

Figure 1:
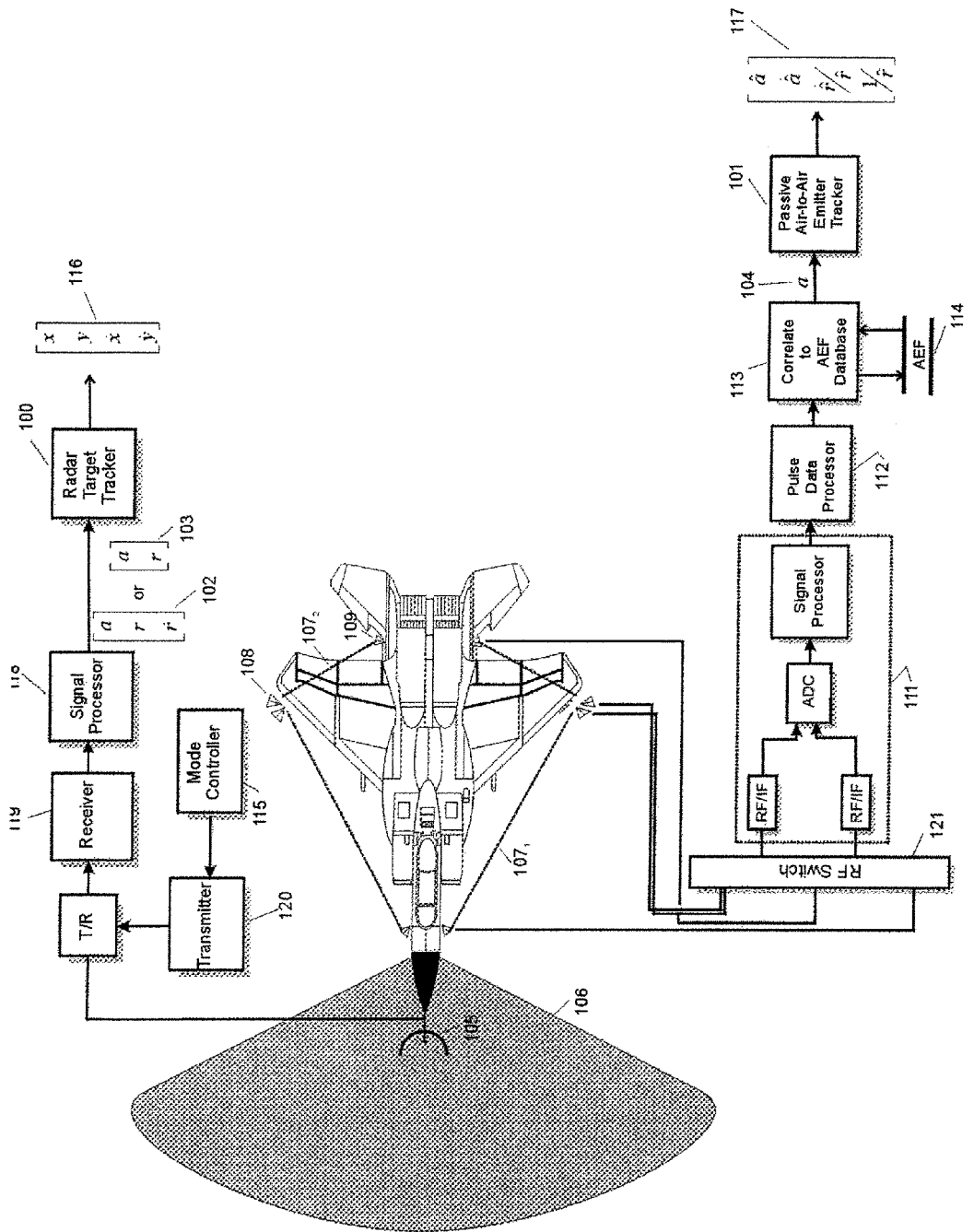
FIG. 1 illustrates a conventional installation of ESM and radar systems on tactical aircraft.
Figure 2:
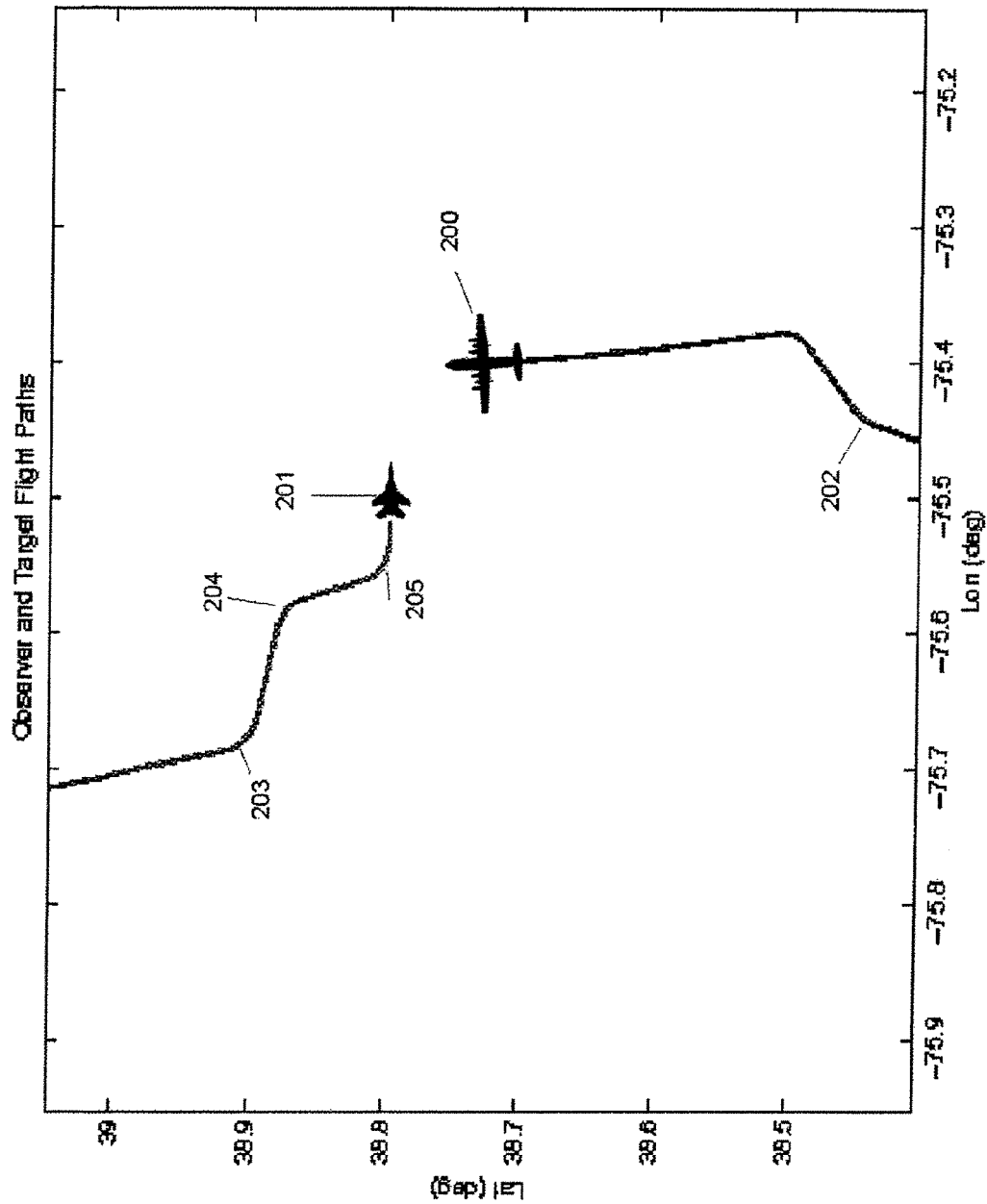
FIG. 2 shows an exemplary observer and emitter flight paths.
Figure 3:
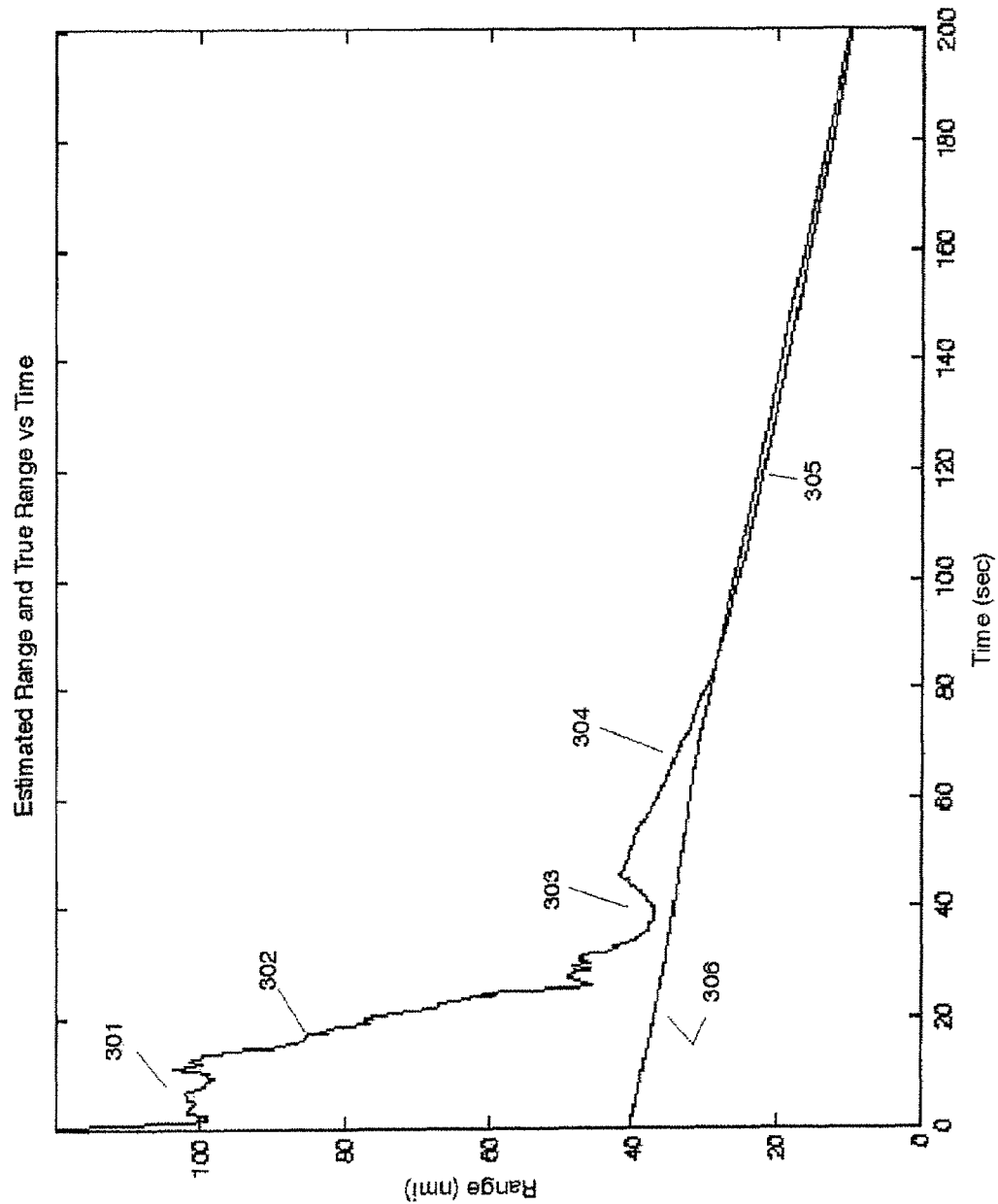
FIG. 3 shows prior art range estimation and true range for the depiction of FIG. 2.

The following experimental results show performance improvement periodic augmented measurements achieved over strictly bearings only passive tracking in the Northrop Grumman Corporation flight test shown in FIG. 2. Both the ESM and radar systems shown in FIG. 1 were essentially implemented on aircraft 200, a BAC 1-11, and data from both systems were collected. Radar measurements 102 (FIG. 1) and ESM azimuth measurements 104 (FIG. 1) were saved with time tags utilizing a system clock similar to system clock 509 (FIG. 5). The measurements were subsequently processed using the method of this disclosure. Specifically, Controller 500 (FIG. 5) requested a fixed augmented measurement update rate of about 0.059 Hz, or every 17 seconds. The core ESM tracking filter implemented in Tracker 504 was the adaptive filter described in the '703 application. Using the bearings-only data this estimator generated FIG. 3 and FIG. 4 results previously discussed, with an azimuth 506 update rate of 1 Hz. The same bearing-only update rate was also used with 0.059 Hz interleaved radar inputs to generate the augmented results shown in FIGS. 6 and 7. The augmented measurements were not merged, and both range and Doppler were available. So the augmented measurements interleaved into azimuth sequence were of the form shown in Equation 2.

Figure 6:
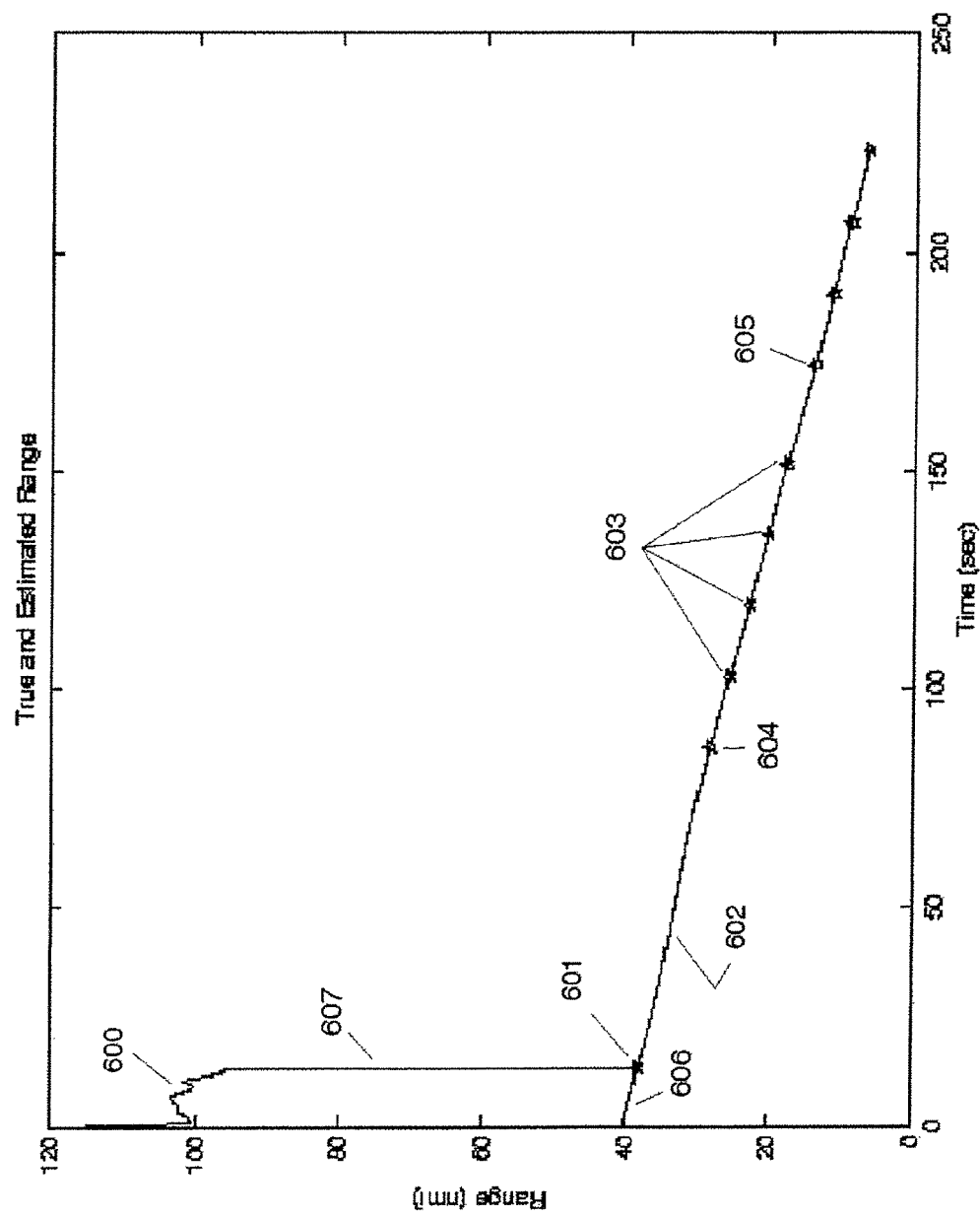
FIG. 6 depicts the range estimation improvement obtained over the results of FIG. 3.

The first augmented update 601 of FIG. 6 occurred before the observer's turn 202 FIG. 2. Thus, the filter's range estimate was initially floating 600 at the same fictitious range 301 (FIG. 3) as in the bearings-only test. Controller 500 (FIG. 5) requested a radar update at initial emitter detection, but the target was outside the BAC radar's FOV. Hence there was the delay in generating the first augmented measurement.

As soon as the estimator processed the augmented update at 601, the tracker's estimate 607 converged to the true emitter range 606, thus verifying observability was immediately achieved without ownship maneuver. This performance should be contrasted to the long transient 302 (FIG. 3) occurring before bearings-only convergence even after maneuver 202 (FIG. 2).

Although 17 seconds was the scheduled spacing between augmented measurements, a long 74 second gap 602 occurred without any augmented update because the target was again outside the radar field-of-view. After that, augmented updates, starting with 604 and continuing through 603 the next four, resumed until another adjustment was made because the emitter was on the edge of the radar FOV when the Controller requested what became augmented measurement 605. The spacing between the last measurement in set 603 and 605 was about 21 seconds. The way ESM/Radar Measurement Controller 500 makes these adjustments to the scheduled update request is discussed further below.

Figure 7:
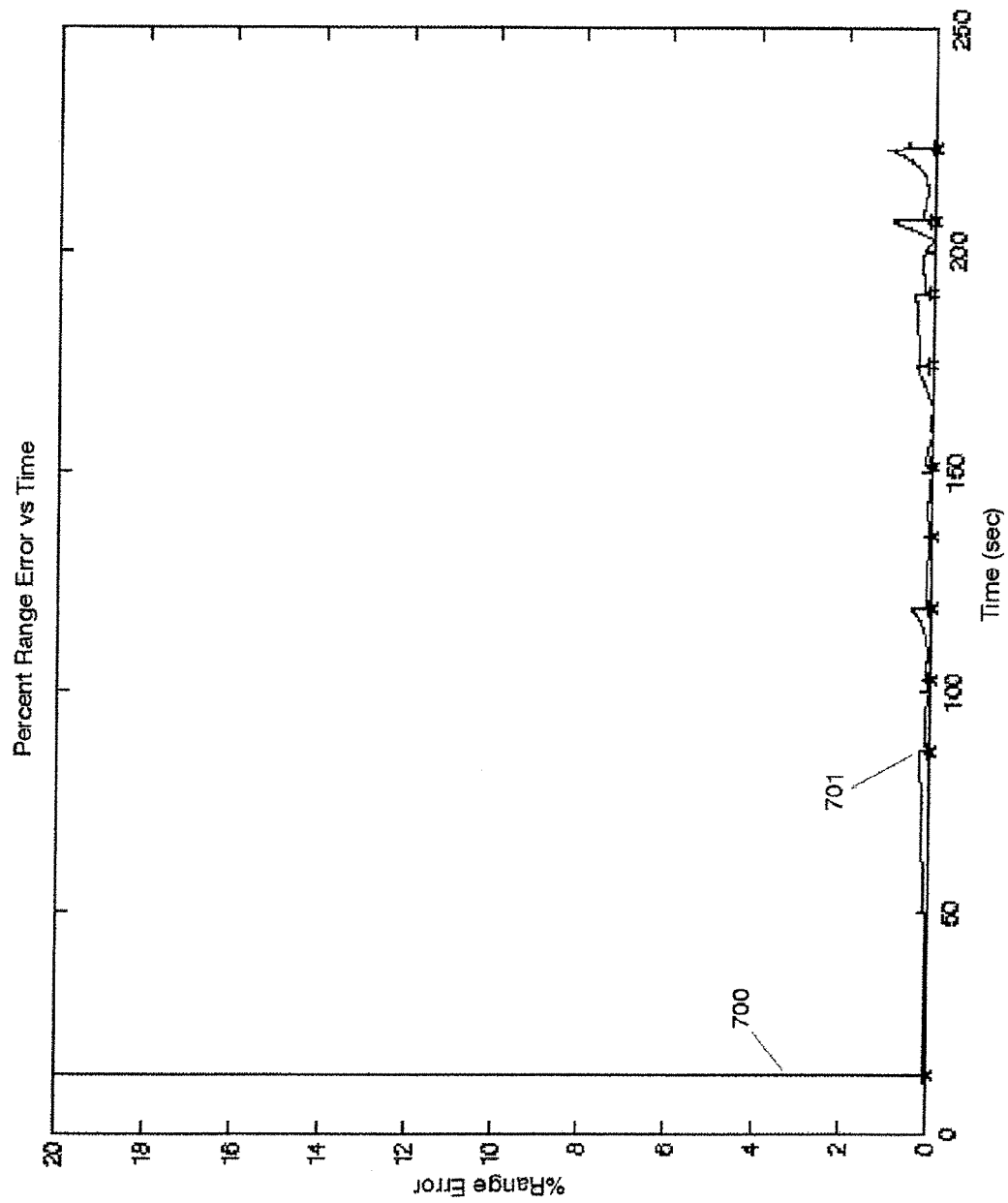
FIG. 7 shows the range error versus time for the estimation results of FIG. 6.

FIG. 7 shows the range error 700 achieved utilizing the augmented measurements. This range error is the difference between the true range 606 (FIG. 6) and range estimate 607. This should be compared to the bearings-only result of FIG. 4, which is the difference between true range 306 (FIG. 3) and range estimate 305. Not only is the augmented range error now well below 1% on the average, but the estimator was able to begin accurate bearings-only tracking about 14 seconds after emitter detection. This is the time of the initial augmented input. By contrast, the strictly bearings-only tracker converges at about 70 seconds (See 401 at FIG. 4). It is noted that the augmented tracker error could be driven even lower with more frequent augmented updates.

Figure 8:
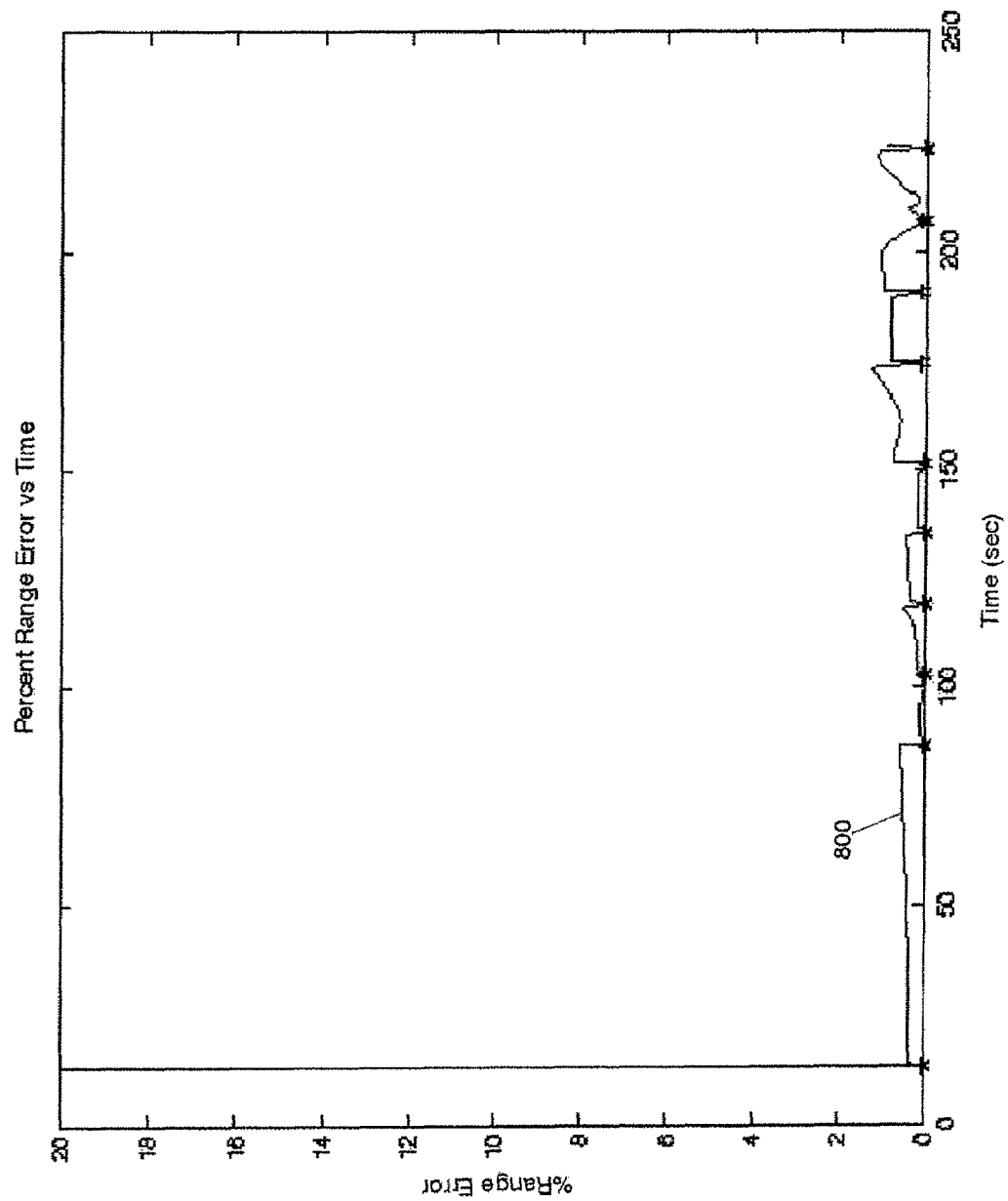
FIG. 8 shows the range error for an embodiment of the disclosure using augmented measurements used in FIG. 7.

The improvement in bearings-only track accuracy provides the option of reducing the bearings-only update rate. FIG. 8 shows the range accuracy achieved when the ESM/Radar Measurement Controller 500 (FIG. 5) retains the 17 second update rate for augmented measurements, but reduces the bearings-only updates to every 3 seconds. Although the error 800 increased the result is still much better than the 1 Hz result in FIG. 4. This is significant because reducing the emitter revisit rate has a profound effect on both MTTI and ESM processing performance. New emitters can be detected sooner, with longer extended data collection dwells available for old ones.

But there can be a potential trade off between improving this aspect of ESM performance and effectively creating a new LPI radar track mode. Creating the new LPI mode requires substituting the ESM estimator for the radar tracker. To obtain the estimate accuracy needed to do this with a lower ESM revisit rate may require higher augmentation rates, increasing the chance of threat ESM systems detecting the new mode, especially when tracking multiple emitters. The alternative, using a lower augmentation rate but standard bearings-only update, may not provide all possible benefits to the ESM system beyond enhanced tracker performance.

It is possible to achieve both LPI and enhanced throughput if the radar has frequency change and power control capability. If the radar is frequency agile, detection vulnerability will not increase for an augmentation revisit rate as high as 0.2 Hz. Also, if the radar uses power control the invention provides a way to enhance this feature and further avoid detection.

FIG. 9 is a schematic system representation of another embodiment of the disclosure. The implementation of FIG. 9 is advantageous because it enables using the existing conventional radar LPI features, handling emitters moving in and out of the radar FOV, provides cueing ranges to the radar before and after the convergence of the ESM tracking filter 911 and can form merged augmented measurements. In FIG. 9 the basic passive system block 926 contains those elements of FIG. 5b 527 previously described, less the ID circuit 908. The passive antenna set 932 can be equivalent to that shown in as element 537 of FIG. 5a. The receiver shown can have two channels 930 switched 931 between antenna pairs in set 932 to form interferometer baselines. This arrangement has been used because of the cost and weight savings but it is non-limiting. For example, a fully channelized receiver could be used, or the bearing could be measured by sensors not forming an interferometer baseline or array. Similarly, the basic active system block 927 FIG. 9 can be identical to element 528 FIG. 5b. The transmit-receive switch 928 allows the antenna or aperture 929 to be used as both an active and passive sensor. This arrangement is also not required when implementing the methods disclosed herein.

Further in FIG. 9, sub-system 900 corresponds to the ID Platform/Emitter function 508 (FIG. 5), sub-system 901 corresponds to ESM/Radar Measurement Controller 500 (FIG. 5), and sub-system 921 corresponds to Augmented Passive Air-to-Air Emitter Tracker 504 (FIG. 5). For clarity the system clock 509 (FIG. 5) is not explicitly shown at FIG. 9, but its function in synchronizing ESM and radar operation are made clear. The embodiment of FIG. 9, provide a great deal of flexibility in carrying out the two key task of track initialization and track maintenance.

ID Platform/Emitter process 900 shows an initialization method for new ESM detected emitters. The augmented track is initiated by the combined interaction of 902 Platform ID and 903 Emitter ID with Determine Bearing Rates 904 and Generate Initial Range/Speed Estimates 905. This interaction is analogous to Applicant's disclosure entitled "Method of Passively Estimating an Emitter's Position and Velocity Using Bearings-Only without Requiring Observer Acceleration", issued as U.S. Pat. No. 6,714,155, which is incorporated herein in its entirety for background information. Such implementation generally results in a set of possible emitter ranges and corresponding velocities.

An element of the initialization method is Generate Initial Range/Speed Estimates 905 which can generate the hypothesized emitter range-velocity set. The hypothesized emitter range-velocity pairs can be used in two ways, depending on the closest possible emitter range in the set. If the closest range estimate is beyond radar detection, the Passive Air-to-Air Emitter Tracker 911 can be initialized as described in the '155 patent and may begin bearings-only tracking. But if the hypothesized range estimate indicates radar detection is likely, process 907 Generate Update Request can schedule an initial augmented dwell.

Once Generate Update Request 907 determines the initial transmission time based on current radar update scan load, it sends the time to Predict Target Position 908 and verifies 909 whether the emitter will be in the radar FOV given observer kinematics and the emitter position predicted from hypothesized range and velocity supplied by Generate Initial Range/Speed Estimates. If not, the predict and verify steps iterate between processes 907, 908 and 909 until the FOV constraint is eventually satisfied.

The predicted target position and other emitter data can be displayed to the pilot, allowing the pilot the option of placing the emitter within the radar FOV. For example, if Platform ID 902 indicates the target is a high priority threat while Radar mode ID 903 determines it is in an acquisition mode and the minimum range estimate generated in 905 places it potentially close, the pilot may elect to maneuver to initiate augmented tracking.

Once in the FOV, process Set LPI Power/Frequency 910 structures the transmission to maximize the likelihood of radar detection while minimizing the chance of threat ESM intercept. In doing this it assumes the hypothesized range is correct. The modified Mode Controller 915 then cues the transmitter 916 so each hypothesized range is pinged along the predicted emitter azimuth with the signal specifically tailored by 910.

The radar pings each possible range, starting with the closest, and stops when the target is detected in Signal Processor 917. Thus, only minimum power is used to initially detect the emitter, even though the ESM system may not provide an unique initial emitter radial location.

After track initialization the system can be in one of two states depending on whether the target was detected by the radar or not. If the radar acquires the target based on the initial hypothesized range set generated in process 905, a rapid, unique solution to the hypothesis test of the '155 patent is provided thereby eliminating the estimation transient time currently required to resolve the ambiguous range-velocity set and the ESM tracker can initialize with the first augmented measurement.

On the other hand, if the target was not detected there may be two possible reasons: estimates put it out of range and so the radar was not cued, or the radar was cued but failed to find anything. If the radar does not acquire the target the ESM tracker 911 continues in conventional bearings-only mode. Generate Update Request 907 monitors target range predictions from Predict Target Position 908 which extrapolates estimates generated by the tracker after each azimuth 912 update. When it determines the target moved within radar range Generate Update Request 907 initiates augmented tracking. Hence, it is important the passive estimator 911 does not break track or lose the emitter because of target maneuvers or other model mismatch problems before augmented tracking begins.

A desirable bearings-only tracker is thus an adaptive estimator such as that described in Applicant's application Ser. No. 11/637,702, filed Dec. 13, 2006, now abandoned, and entitled "Method and Apparatus for Tracking a Maneuvering Emitter Utilizing Reduced Order State Estimators", which is incorporated herein in entirety for background information.

This technique uses either modified polar or spherical coordinates. In the implementation shown modified polar coordinates are used, i.e. the ESM system does not measure elevation. The modified polar target state 913 is then the output of Passive Emitter Tracker 911 whether in bearings-only or augmented track mode. While in strictly bearings-only, the ESM azimuth update rate can be optimal for maintaining track. Typically this requires at least a 1 Hz emitter revisit rate. But as noted when in augmented mode the bearings-only updates between augmented measurements can be at a lower rate.

As also noted, one of the features of the modified polar model is that merged augmented measurements are not required. Nevertheless, using merged augmented measurements benefits the "Reduced Order" adaptive operation. Also, other core estimator state models, especially those based on Cartesian coordinates, can required the merged implementation. Forming the merged augmented measurements involves two steps: time synchronization and state transformation. These are carried out in process 922 Generate Augmented Measurement.

Because the ESM and radar systems update independently, the ESM azimuth 912 and radar measurements 918 or 919 can be made at slightly different times. Thus, there may be a need for additional adjustment. After the adjustment, the updates are placed in a form best adapted to the state model used in the estimator. For the modified polar (or modified spherical) model a convenient form of the augmented measurement vector, combining extrapolated ESM measured azimuth a and radar measured range r, is $$\begin{pmatrix} a \\ 1/r \end{pmatrix} \quad (3)$$

if only range is available, and $$\begin{pmatrix} a \\ \dot{r}/r \\ 1/r \end{pmatrix} \quad (4)$$

Doppler $\dot{r}$ is also measured.

Using these forms preserves the linear measurement model in the modified polar ESM tracker 911, but generates non-Gaussian measurement errors. Other forms preserving the Gaussian measurement noise, but requiring a nonlinear measurement model are, of course, possible.

The advantage to having a linear measurement model is the ease with which the new measurements are incorporated. When updating with an augmented input the estimator must be modified to accept the measurement vector instead of the scalar azimuth. This is done in process 923 Modify Input Matrix. If the measurement model is linear, this modification simply requires switching to a new input or measurement matrix with fixed elements. The rest of the estimator implementation stays in its original bearings-only form.

Either the ESM angle or range data can shift to achieve the needed time coincidence. The azimuth can be adjusted as the technique of the '155 patent can be used in process 905 to obtain initial range and the so-called Reduced Order method can be used to subsequently track the emitter. Both Determine Bearing Rate 904 and the Passive Estimator 911 incorporate a second order adaptive azimuth filter. Hence, both are shown providing inputs to Generate Augmented Measurement 922. These inputs are derived from the azimuth state model, which provide the basis for extrapolating measured azimuth 912 either backward or forward in time to match the radar update.

As part of this extrapolation the azimuth filter can produce an error covariance estimate, which supplies the azimuth measurement error input to the ESM tracking filter. Based on the radar processing used, an equivalent Gaussian variance can be determined for 1/r and $\dot{r}$/r. The measurement errors for these two are correlated, but independent of ESM generated azimuth. The independence means the original adaptive features of the bearings-only tracking filter, which are based on azimuth statistics, do not have to be changed.

After initialization and convergence ESM tracker 911, not Generate Initial Range/Speed Estimates 905, provides the range and velocity estimates used by Predict Target Position 908. From the previous description it is clear the output of 908 is basic both to verifying the target is within the radar's FOV, and to adjusting 910 the power and frequency for optimal LPI operation. The candidate radar update times used by Predict Target Position are generated in Determine Radar Update Rate 906. Subsequent to the initial radar measurement, this process determines the time interval for future updates using Platform ID 902 and Radar Mode ID 903 inputs. It can be advantageous to make this update is a fixed constant. A fixed rate maintains ESM track accuracy. It also benefits the radar operation since the best and longest processing interval is not required to pull the ESM performance back to the desired accuracy after bearings-only tracking between augmentation updates.

But extended gaps in a fixed update schedule can occur. For example, the augmented update times may be adjusted when the target moves in and out of the radar FOV or detection range. Each augmentation update time generated by Determine Radar Update Duty Cycle 906 is checked by Generate Update Request 907 to determine if both these criteria are satisfied. This check can be essentially identical to the processing used in the initialization step, except now Determine Radar Update Duty Cycle 906 is added as an element in the adjustment loop. When a measurement is skipped Update Duty Cycle 906 can translate the subsequent request times into the future and tries to recover the desired fixed update rate.

Thus, gap 602 (FIG. 6) was caused by the emitter 201 (FIG. 2) flying outside the BAC 1-11 radar FOV. Once the augmented measurement was skipped Determine Duty Cycle 906 temporarily abandoned the 17 second duty cycle and reverted to a short time interval just large enough to allow, after processing for the FOV constraint, cueing the radar and transmitting. This new interval was added to the current time and fed to Predict Motion 908 recursively until eventually the FOV constraint was satisfied and next measurements 604 (FIG. 6) made. Determine Radar Update Duty Cycle 906 then generated 603 (FIG. 6) the four 17 second updates until at 605 (FIG. 6) when Generate Updates again caused it to time-shift slightly.

Skipping augmented updates can impact both the tracking filter and radar. But when the Reduced Order method is used to implement passive emitter tracking 911, the adaptive features of the estimator allows tracking the target through maneuvers during a long augmentation gap. For example, in the NGC flight test shown in FIG. 2, emitter heading change 203 occurred during the gap 602 (FIG. 6). But the range error 700 (FIG. 7) during this time did not increase significantly. Although growing, it was still below 0.5% at the next augmented update 701 (FIG. 7) although the gap was 74 seconds.

Another advantage to using the adaptive tracker is the target state estimate error covariance, i.e., the tracker's computation of the error on state estimate 913, is always realistic.

Figure 4:
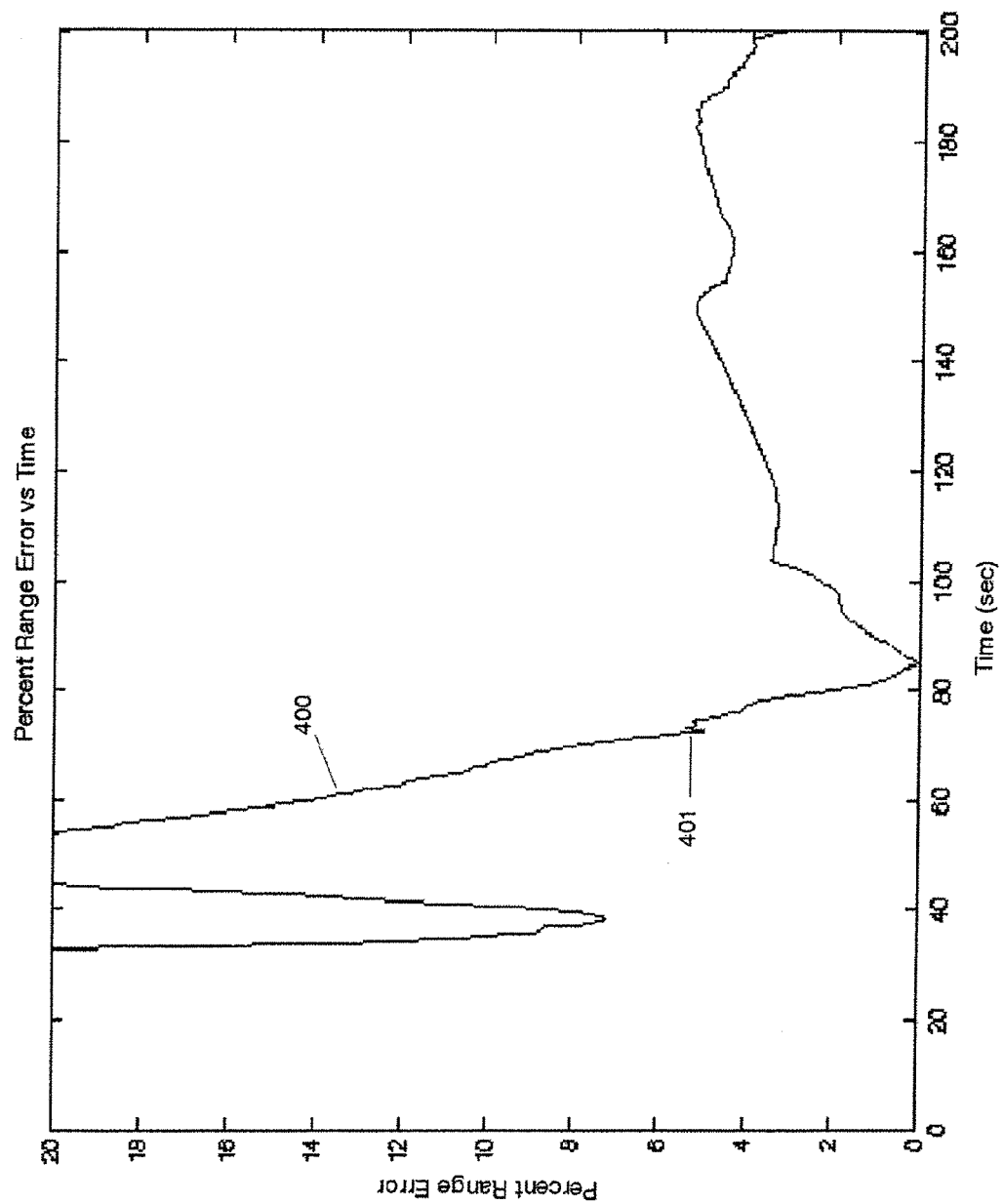
FIG. 4 shows the range error versus time associated with the estimation results of FIG. 3.

Thus, the filter is able to provide an estimate of its error that closely correlates with the real error, e.g. that shown in FIG. 4 or 7.

There can be augmentation gaps during which the estimated error can grow beyond the desired system track error. Process 920 Skipped Measurement determines if the estimator error indicates adjustment to the radar signal is needed. If so, then the LPI transmitted signal adjustment made in 910 is not as important as reducing radar measurement errors in order to pull the ESM tracker back within the desired error bound. This adjustment for maximum accuracy can be made in process 914.

Otherwise, when there are no skipped updates, Set LPI Power/Frequency 910 can structure the transmitted signal for optimal LPI operation. With no skipped updates the constant duty cycle rate generated by Determine Update 906 completely fixes the radar transmission times. This constant update maintains track accuracy and hence allows Set LPI Power/Frequency 910 to optimize the transmission to avoid intercept.

After updating with the vector augmented measurement, estimator 911 uses scalar 912 azimuth-only inputs until process Update 907 generates the next augmented measurement for this particular emitter based on the Determine 906 duty cycle. That is, the duty cycle is emitter-specific in one implementation. The method for determining the duty cycle for a single emitter was discussed previously and may involve trading off track accuracy with the likelihood threat ESM systems will age-out a detected burst.

The operation of Set LPI Power/Frequency 910, Generate Duty Cycle 906 and Predict Target Position 908 together is crucial to avoid detection by not just the tracked system but any threat ESM system in the environment. The age-out criterion Generate Duty Cycle uses to fix the update rate does not apply to other ESM systems. A strategically placed threat may intercept many burst when augmented measurements are updated against a large number of emitters. But the interaction of Generate Duty Cycle 906, Predict Target Position 908 and Set LPI Power/Frequency 910 causes the burst to occur at different angles, power levels, frequencies and transmission times.

Thus, ownship scan is not the periodic spatial revisit pattern used in search mode. Nor is it that used in conventional track. Also the frequency changes and update rates are not those typical for any current search, acquisition or track mode. Hence there is no discernable scan or frequency pattern any threat ESM system in the environment can use to schedule future pulse collections.

Thus the invention achieves the objective of preventing not only the tracked emitter's ESM system, but all threat ESM systems from exploiting ownship's radar burst. And so the invention, when fully implemented, creates a new LPI radar mode. Although using this mode requires threats to transmit, that is generally the time ownship benefits most from not having its own transmissions detected.

In describing this invention the radar was illustrated by a specific block diagram with Mode Controller the dominant transmission gating process. But it will be clear to those skilled in the art the invention is not specific to that representation or dependent on any special signal modulation or structure. Using well understood techniques it can be incorporated in radar designs using virtually any transmission control and waveform. This is also true of the particular ESM tracking filter used. Although the use of modified polar or spherical coordinate state-space models was extensively discussed, other passive tracker implementations are equally viable.

The embodiments disclosed herein provide many advantages, including: (1) eliminating the need for radar search and acquisition modes, exploiting the ESM system's advantage in detecting emitters at very long range and all relative bearings; (2) solving the ESM tracker bearings-only initialization and observability problem without an ownship maneuver; (3) providing a rapid, unique answer for the hypothesis test in '155 patent, eliminating the estimator transient time currently required to resolve the ambiguous range-velocity set; (4) preventing track divergence in conventional non-adaptive ESM estimators; (5) improving adaptive ESM estimator track accuracy; (6) eliminating the radar track mode by substituting the adaptive ESM estimator for the radar tracker in appropriate operational regimes; (7) enhancing detection and throughput capabilities of ownship's ESM system by utilizing the improved bearings-only estimator accuracy to reduce revisit rates; (8) minimizing the probability of radar detection by the threat through adjusting the transmitted signal using the ESM emitter parameter and kinematics data; and (9) preventing exploitation of ownship's radar transmission by both the emitter ESM system and other threat ESM systems by scheduling the radar updates to minimize the ESM's ability to successfully process intercepted signals.

It should be noted that augmented measurements generally have an update rate so low the radar bursts sent along the emitter's azimuths are many seconds apart. So intercepted signals cannot be correlated on angle. Also, because of its exceptionally long duty cycle, even if the threat ESM system detects a burst, it cannot schedule an extended dwell to support parameter extraction. In fact, infrequent intercepted burst will typically be classified as false alarms since ESM detection approaches and their enhancements, will not discover subsequent transmissions occurring in frequency dwells near to the first. Even if pulse intercepts many seconds apart fortuitously occur, current associative techniques will not cluster the pulses with previous sets. These techniques depend on conventional radar emitting patterns. But the long duty cycle disclosed herein matches no existing search, acquisition or track mode behavior. Thus, it provides no template for radar verification.

For these reasons, ESM parameter extraction, of which U.S. Pat. No. 4,516,220 to Baumann entitled "Pulse Deinterleaving Signal Processor and Method" and U.S. Pat. No. 7,133,887 to Sirois entitled "Detection and Identification of Stable PRI Patterns Using Multiple Parallel Hypothesis Correlation Algorithms" are representative elements, is no longer applicable. Also critical ESM and RWR processing such as those disclosed in U.S. Pat. No. 7,148,835 to Bricker, et al. and entitled "Method and Apparatus for Identifying Ownship Threats" will not discover the radar is tracking the emitter.

The embodiments described herein are exemplary and non-limiting. The scope of the disclosure is defined solely by the appended claims when accorded a full range of equivalence with many variations and modifications naturally occurring to one of ordinary skill in the art without departing from the scope of the claims.

What is claimed is:

1. A method for estimating and predicting a target emitter's kinematics, the method comprising the steps of:
   (a) passively sampling, at a first sampling rate, an emitter signal to obtain at least one passively measured signal attribute for estimating the target kinematics;
   (b) inputting the passively measured signal attribute to an estimator at a first sampling rate;
   (c) determining a radar duty cycle for active radar measurements as a multiple of the first sampling rate, the multiple defining a duration between radar transmissions;

(d) directing a radar system to make active target measurements at the determined duty cycle; and (e) inputting to the estimator the active target measurements at the determined duty cycle, while continuously inputting the passively measured signal attributes to the estimator.

2. The method of claim 1, wherein with the first sampling rate defines an average measurement rate supporting target kinematics estimation.

3. The method of claim 1, wherein the multiple is greater than 1.

4. The method of claim 1, wherein the passive sampling is made by an intercept receiver.

5. The method of claim 1, wherein the at least one signal attribute comprises direction of arrival characteristics.

6. The method of claim 5, wherein an emitter bearing or an azimuth is derived from the direction of arrival characteristics.

7. The method of claim 1, wherein the estimator is a bearings-only estimator.

8. The method of claim 7, wherein the active target measurements are adapted for communication with bearings-only estimator kinematics model.

9. The method of claim 1, wherein the active target measurements include target range measurements.

10. The method of claim 1, wherein the radar active measurements include both target range and range rate measurements.

11. The method of claim 10, wherein both target range and range rate measurements are adapted for communication with bearing-only estimator kinematics model.

12. The method of claim 11, wherein the transformed radar measurement is combined with a passive azimuth measurement to form a single input to the estimator.

13. The method of claim 1, wherein the determined radar duty cycle defines a first transmission time for the active target measurement.

14. The method of claim 13, wherein the estimator provides a preliminary target position estimate.

15. The method of claim 14, wherein the preliminary target position is used to adjust the radar transmitted power and transmitted signal characteristics as a function of the passively estimated target kinematics.

16. The method of claim 15, wherein data including at least one of the target azimuth or elevation is extracted from the preliminary target position estimate.

17. The method of claim 1, wherein the target kinematics estimated from the passive bearing measurements directs active target measurement.

18. The method of claim 1, wherein the signal attribute identifies the target as belonging to a restricted class of emitters.

19. The method of claim 18, wherein the target is further associated with a most probable set of platforms.

20. The method of claim 19, wherein a signal intercept capability of the most probable set of platforms is used to determine the minimum period between radar transmissions or the minimum duty cycle.

21. The method of claim 19, wherein a maneuver capability of the most probable set of platforms is used to determine the maximum possible period between radar transmissions or the maximum duty cycle.

22. The method of claim 1, wherein step (d) further comprises:

(1) predicting a first target position with the passively measured signal attribute;

(2) determining from the predicted position if the emitter will be in a field of view and detection range of the radar system;

(3) generating a radar system update request consistent with the duty cycle if the emitter is within the field of view and detection range of the radar system;

(4) increasing the associated duty cycle measurement interval if the emitter is not within the field of view or detection range of the radar system; and (5) repeating steps 1-3.

23. An apparatus for estimating an emitter's kinematical state, the apparatus comprising:

a primary control circuit having at least one microprocessor configured with instructions to control a passive measurement system and an active measurement system and to:

(a) passively sample, at a first sampling rate, an emitter signal to obtain at least one passively measured signal attribute for estimating the target kinematics;

(b) input the passively measured signal attribute to an estimator at a first sampling rate;

(c) determine a radar duty cycle for the active measurements system, the duty cycle defining a duration between emitter detection by the active measurement system;

(d) direct the active measurement system to detect emitter consistent with the duty cycle; and (e) input the active target measurements to an estimator consistent with the duty cycle while continuously inputting the passively measured signal attributes to the estimator.

24. The apparatus of claim 23, wherein the duty cycle is a multiple of the first sampling rate.

25. The apparatus of claim 23, further comprising an intercept receiver for passive signal measurement.

26. The apparatus of claim 25, wherein the intercept receiver further comprises a memory circuit and a microprocessor in communication with a passive measurement control circuit.

27. The apparatus of claim 25, wherein the passive measurement control circuit repetitively tunes the intercept receiver to an emitter frequency for achieving the first sampling rate.

28. The apparatus of claim 23, wherein the at least one signal attribute comprises at least one of direction of arrival characteristics or azimuth.

29. The apparatus of claim 23, wherein the estimator is a bearings-only estimator.

30. The apparatus of claim 23, wherein the active measurement system comprises a radar system for transmitting a radar signal to the emitter.

31. The apparatus of claim 30, wherein the measurement made by the radar system comprises at least one of an emitter range or a rate of change in the emitter range.

32. The apparatus of claim 30, further comprising an active measurement control circuit for adjusting the radar signal power or radar signal characteristic as a function of a passively-estimated emitter position.

33. The apparatus of claim 30, further comprising a primary control circuit for directing the radar signal toward a passively-estimated emitter position.

34. The apparatus of claim 23, wherein the duty cycle defines a first transmission time for the active measurement.

35. The apparatus of claim 34, wherein the kinematics estimator utilizes the signal attribute to estimate emitter position before the first active detection.

36. A device for determining emitter kinematics, comprising:
- a passive measurement system for passively sampling an emitter signal and determining at least one emitter bearing from a sampled signal;
- a filter circuit for determining at least one of an emitter velocity or an emitter position;
- an active measurement system for actively measuring at least one of an emitter range or a radial range rate; and
- an augmented measurement controller in communication with the passive measurement system and the active measurement system, the augmented measurement controller receiving data from the passive measurement system and deriving a control signal for the active measurement system, the control signal defining a set of radar transmission times as a function of the passive measurement system.

37. The device of claim 36, wherein the passive measurement system determines an emitter bearing for each sampled signal.

38. The device of claim 36, wherein the filter circuit further comprises a kinematics estimator configured to provide estimated emitter kinematics including an emitter velocity or an emitter position.

39. The device of claim 38, wherein the emitter velocity or the emitter position are derived from an emitter bearings or a passive emitter bearing measurements augmented by an active target measurement.

40. The device of claim 36, wherein the active measurement system periodically transmits a signal and determines at least one of the target range or the radial range rate from the signal transmission.

41. The device of claim 40, wherein the active measurement system communicates the target range and the radial range rate with the filter circuit.

42. The device of claim 36, wherein the augmented measurement controller determines the control signal for establishing an emitter bearing input rate to the filter circuit.

43. The device of claim 36, wherein the augmented measurement controller causes the emitter signal to be sampled at least at the emitter bearing input rate by a passive measurement circuit.

44. The device of claim 36, wherein the augmented measurement controller instructs the filter circuit to accept measurements from active measurement system.

45. The device of claim 36, wherein the augmented measurement controller determines an input rate for an augmented data as a function of the filter circuit, a bearing data rate, and data from the passive measurement system.

46. The device of claim 45, wherein the augmented measurement controller instructs the active measurement system to update active measurement using the control signal having an augmented input rate.

47. The device of claim 36, wherein the modified passive tracker circuit further comprises a passive emitter tracking sub-circuit, a first circuit for generating augmented measurements, and an input modifying circuit to estimate emitter kinematics from the target bearing measurements alone, or from range data communicated from the active measurement system in an augmented measurement.

48. The device of claim 36, wherein the measurement controller further comprises a system clock for synchronizing an input of the filter circuit with an output of the active measurement system.

49. The device of claim 48, wherein the clock enables synchronization of passively-made bearing measurements and at least one of range, and range rate.

50. The device of claim 36, wherein the active measurement system further comprises a transmitter, a mode controller, a receiver and a signal processor.

51. The device of claim 36, wherein the passive measurement system further comprises a passive signal sensors, an intercept receiver, an emitter correlation circuit, database, and emitter-to-platform identification circuit.

* * * * *